Sept. 26, 1967    K. M. SPARROW    3,344,338
DYNAMO ELECTRIC MACHINES
Filed Feb. 28, 1964    4 Sheets-Sheet 1

INVENTOR.
KENNETH M. SPARROW
BY
James E. Fralick
ATTORNEY

Sept. 26, 1967  K. M. SPARROW  3,344,338
DYNAMO ELECTRIC MACHINES
Filed Feb. 28, 1964  4 Sheets-Sheet 2

INVENTOR.
KENNETH M. SPARROW
BY James E. Fralick
ATTORNEY

Sept. 26, 1967 K. M. SPARROW 3,344,338
DYNAMO ELECTRIC MACHINES
Filed Feb. 28, 1964 4 Sheets-Sheet 3

INVENTOR.
KENNETH M. SPARROW
BY
ATTORNEY

Sept. 26, 1967     K. M. SPARROW     3,344,338
DYNAMO ELECTRIC MACHINES
Filed Feb. 28, 1964                              4 Sheets-Sheet 4

INVENTOR.
KENNETH M. SPARROW
BY
ATTORNEY

United States Patent Office 3,344,338
Patented Sept. 26, 1967

3,344,338
DYNAMO ELECTRIC MACHINES
Kenneth M. Sparrow, Sioux City, Iowa, assignor to James E. Fralick, Columbus, Ohio, trustee
Filed Feb. 28, 1964, Ser. No. 348,125
16 Claims. (Cl. 322—75)

ABSTRACT OF THE DISCLOSURE

A brushless, alternating current generator, comprising a synchronous alternator, of the revolving field type, in combination with an alternating current exciter, having a stationary, direct current field winding, a rotatable generator winding and rectifier, arranged for rotation with the exciter and alternator rotor windings. A direct current field winding and a direct current saturating coil winding are located upon the exciter stator. The saturating coil winding, of the exciter stator, produces a saturating coil flux; which operates to modify the saturation and magnetic reluctance of the exciter main field magnetic circuit, in response to an electrical characteristic of the alternator output current, so as to control the power output of the exciter.

Summary

The invention, which is disclosed herein and illustrated in the appended drawings, relates generally to dynamo electric machines. More specifically, the present invention is directed to novel means for exciting the rotating field of a brushless alternating current generator.

The increasing use of portable machines, which are driven by induction type alternating current motors, has created a need for improved alternating current generators, of the brushless type; which will afford portable sources of highly reliable electric power, under circumstances where significant variations occur in the electrical load demand. Such devices must be capable of supplying electric power, characterized by minimum variations in output voltage under circumstances of intermittent heavy electrical overloads.

In order to satisfy these requirements, an alternating current generator may be provided with means for exciting the generator field, which is capable of supplying an over-compensated excitation current; in response to changes in electrical characteristics of the generator output. It is also desirable that the power output of such an excitation means should be closely limited to the requirements of the generator, by a suppressor type of voltage control.

A variety of devices have been utilized for such applications in the past. Some of these devices have included over-compensated magnetic amplifier units of the saturable reactor type, in association with a suppressor type of voltage control unit. Such devices have been of a static type, directly associated with rotor elements of the generator structure. The excitation current, produced by such devices, is transmitted to the rotating field of a generator through the intervening agency of slip rings, and similar means involving the use of frictional conductors, such as brushes.

Recent advances in semi-conductor art have made practical the use of solid state rectifiers in brushless, alternating current generators. Rectifier elements of this type may be mounted upon, and rotatably carried by, the same rotor shaft which drives rotor elements of an alternating current generator and an associated means for excitation of the generator. The output current of the exciter armature may then be transmitted to the generator rotor field through rectifiers, mounted on a common rotor shaft, so as to provide the direct current necessary for energizing the field winding of the generator rotor.

However, the over-compensated suppressor type of excitation system, described above, has not previously been available in a brushless, alternating current generator having a synchronous or inductor type of exciter. The present invention provides improved means for excitation of such generators; which is capable of producing an over-compensated excitation output, regulated by a suppressor type of voltage control. The device of this invention may be incorporated in a brushless, alternating current generator, having either a synchronous or an inductor type of exciter.

An alternating current exciter, of the stationary field type, is provided in the present invention. The residual magnetism which is inherent in the magnetic structure of the stator of such an exciter, aids in the initial build-up of the generator output voltage. The electric current necessary for excitation of the rotating field of the generator, is derived from an exciter armature winding and transmitted to the generator rotor field winding, through rotating rectifying means, which may be mounted upon and rotatably driven by the same shaft which rotates the exciter armature winding and the generator rotor field winding.

A main field winding, located on the exciter stator, is energized by rectified current derived from the output winding of the alternating current generator. The output current of the generator is directed through a current transformer and rectifiers which serve as means for compensating the output current of the exciter, in response to changes in the electrical load imposed upon the generator. A saturating winding, located on the exciter stator, operates to provide close control of the output voltage of the generator.

A generator, incorporating exciter means, constructed according to the present invention, is characterized by rapid response to changing conditions of electrical load, as a result of the current-compensating characteristics of the improved exciter structure. The present invention also provides improved means for generator voltage control, including a saturating winding located on the exciter stator.

Objects

One object of this invention is to provide an improved dynamo electric machine.

A second object of the present invention is to provide an improved brushless alternating current generator having a synchronous or inductor type of exciter.

Another object of the invention is to provide a brushless, alternating current generating machine, capable of producing electric power, characterized by a minimum variation in output voltage, under circumstances of intermittent heavy electrical overloads.

A further object of this invention is to provide an improved generator field exciter, capable of producing an over-compensated output current, regulated by a suppressor type of voltage control, for energizing the field of a brushless alternating current generator having a synchronous or inductor type exciter.

Still further objects and features of this invention will be apparent from the subjoined specification and claims, when they are considered together with the associated drawings.

Drawings

Description

Figure 1:
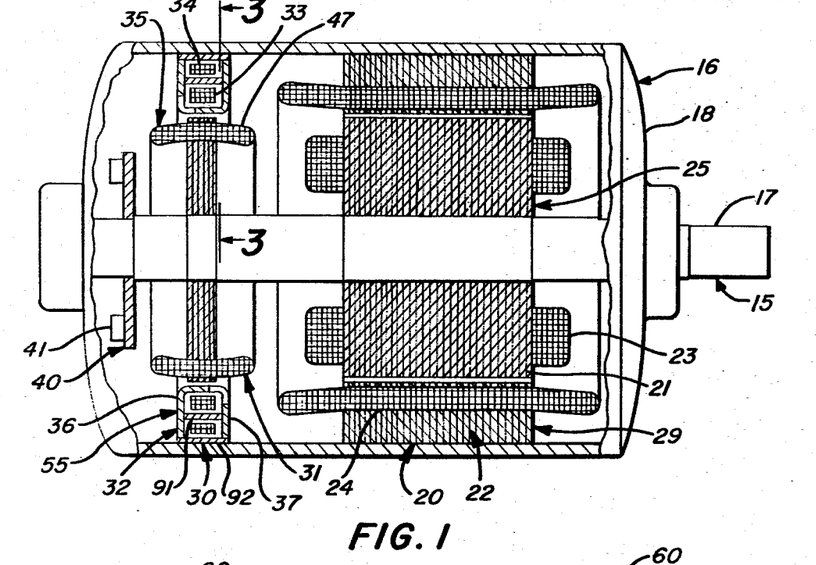
FIG. 1 is a diagrammatic view in longitudinal section showing the structure of an exciter flux valve embodiment of the device of this invention.

Briefly summarized, the device of the present invention is shown in FIG. 1 to be a dynamo electric machine 16, comprising in combination: stationary means 29 for generating an alternating electric current in the presence of a rotating magnetic field; rotatable means 25 for producing a magnetic field when excited by a direct current; rotatable means 35 for generating an alternating output current, when rotated in the presence of a stationary magnetic field; stationary means 55 for producing a stationary magnetic field when energized by a direct current; stationary rectifier means 50 (FIG. 2), for converting said alternating current generated by said stationary generating means 29 to direct current and energizing said stationary field means 55; rotatable rectifier means 40 for converting said output current, generated by said rotatable generating means 35, and exciting said rotatable field means 25; means 15 (FIG. 1) for simultaneously rotating said rotatable field means 25, said rotatable generating means 35, and said rotatable rectifier means 40; means 60 (FIG. 2) for varying the power input to said stationary magnetic field means 55 in response to variations in electrical output characteristics of said stationary generating means 29; a magnetic circuit 65 (FIG. 4) comprising said rotatable generating means 35 and said stationary magnetic field means 55; and means 70 (FIG. 1) for modifying the magnetic reluctance of said magnetic circuit 65, so as to control a characteristic of the voltage generated by said rotatable generating means 35, in response to an electrical output characteristic of said stationary generating means 29.

Referring specifically to the drawings for a more detailed description of the device of this invention, FIG. 1 illustrates a first embodiment of the invention in the form of an exciter flux valve structure, which is shown as a dynamo electric machine 16, comprising a generator portion 20 and an exciter portion, broadly designated as 30. A rotor portion 21 and a stator portion 22 are provided in generator 20. A rotor portion 31 and stator portion 32 are provided in exciter 30.

Means 29 for generating an alternating electric current in the presence of a rotating magnetic field, comprises stator 22, of generator 20, and alternating current output winding 24, located on generator stator 22.

Rotatable means 25 for producing a magnetic field when excited by direct current, comprises rotor portion 21 of generator 20 and direct current excitation winding 23, located on generator rotor 21.

Rotatable means 35 for generating an alternating output current, when rotated in the presence of a stationary magnetic field, comprises rotor portion 31, of exciter 30, and alternating current output winding 47, located on exciter rotor 31.

Stationary means 55 for producing a stationary magnetic main field when energized by direct current, comprises main field excitation winding 33, located on exciter stator 32.

Stationary rectifier means 50 (FIG. 2) for converting said alternating current generated by said stationary generating means 29 to direct current, and energizing said stationary field means 55, comprises a plurality of rectifiers 51, 52, 53 and 54.

Rotatable rectifier means 40, for converting said output current, generated by said rotatable generating means 35, and for exciting said rotatable field means 25, comprises a plurality of rectifiers 41.

Means 15, for simultaneously rotating said rotatable field means 25, said rotatable generating means 35 and said rotatable rectifier means 40, comprises a rotatable shaft 17.

Figure 2:
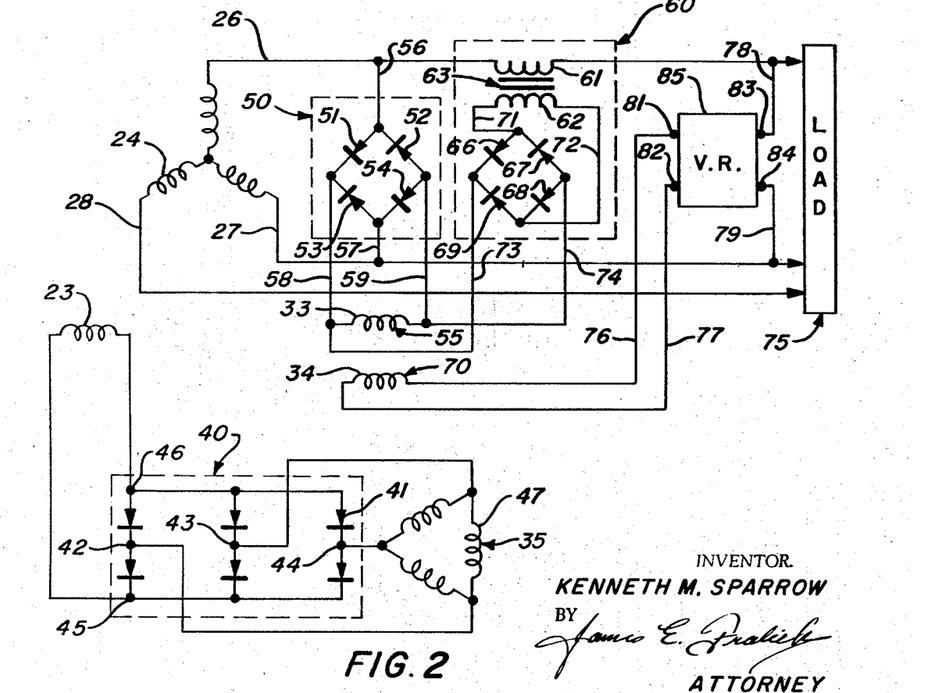
FIG. 2 is a schematic diagram showing the electrical circuit of this invention.

Means 60, for varying the power input to said stationary magnetic field means 55, in response to variations in electrical output characteristics of said stationary generating means 29, comprises a current transformer 63 and a plurality of rectifiers 66, 67, 68 and 69.

Figures 4, 5:
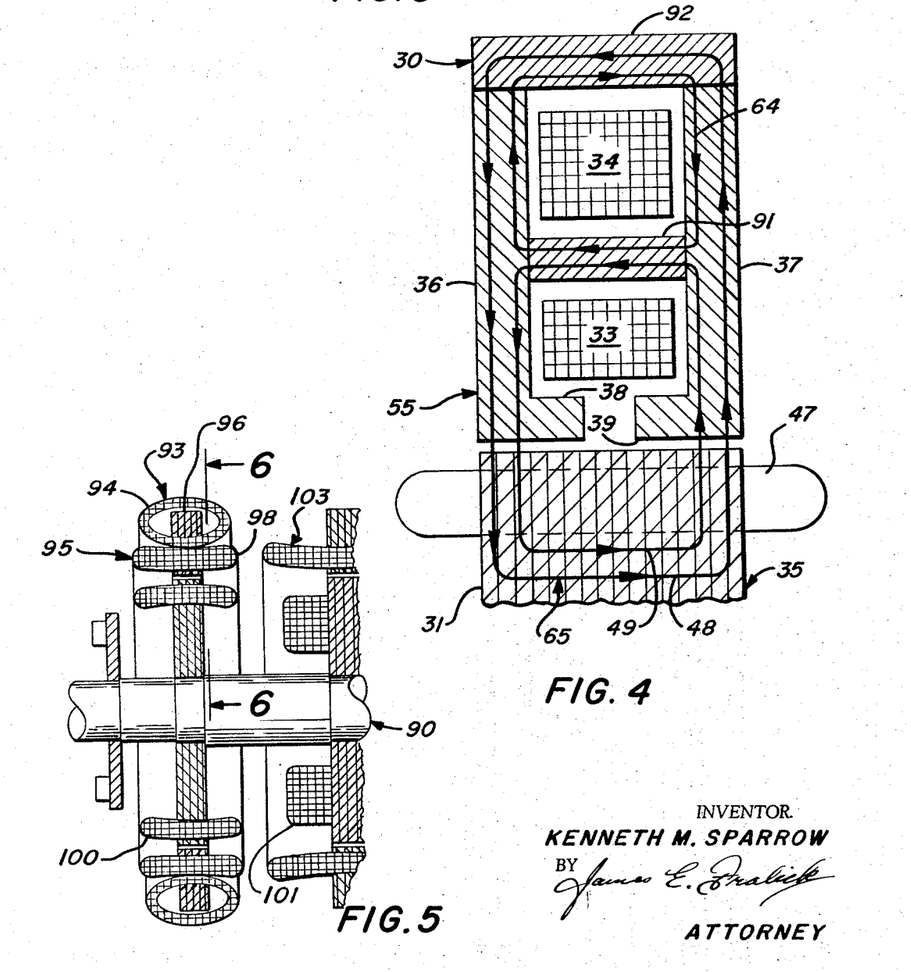
FIG. 4 is a fragmentary view in section, taken along the line 4—4 of FIG. 3, illustrating magnetic circuits of this invention.
FIG. 5 is a fragmentary longitudinal section of a toroidal saturating coil embodiment of the invention.

A magnetic circuit 65 is shown in FIG. 4 as comprising said rotatable generating means 35 and stationary magnetic field means 55.

Means 70, for modifying the magnetic reluctance of magnetic circuit 65, so as to control a characteristic of the voltage generated by said rotatable generating means 31, in response to an electrical output characteristic of said stationary generating means 22, comprises, in combination, exciter saturating coil winding 34, and voltage regulator 85.

Referring to FIG. 1, the dynamo electric machine 16 comprises a housing 18 in which is mounted a shaft 17, rotatably mounted by suitable bearings (not shown). Rotor 21 of generator 20 and rotor 31 of exciter 30 are preferably both mounted on and rotatable with shaft 17. Also mounted on shaft 17 is rectifier means 40, which is shown, by way of example, as a plurality of rectifiers 41, of the silicon type. Rectifier means 40 is provided with polyphase alternating current input terminals 42, 43, and 44; and with direct current output terminals 45 and 46.

Generator rotor 21 is provided with a direct current field winding 23, which is connected across output terminals 45 and 46 of rotatable rectifier means 40. Exciter rotor 31 has a winding 47, which is illustrated as three-phase in FIG. 2. The alternating current output of winding 47 is connected to input terminals 42, 43 and 44 of rectifier means 40.

Stator output winding 24 of generator 20 is illustrated in the circuit diagram of FIG. 2 as a three-phase winding; and is connected to output conductors 26, 27 and 28, which are in turn connected to an electrical load 75, when dynamo electric machine 16 is used to supply power for the operation of a device driven by electric power derived from machine 16.

Stator 32 of exciter 30 includes a direct current main field winding 33 and a direct current saturating coil winding 34. Conductors 56 and 57 (FIG. 2) connect the generator output conductors 26 and 27 to the input of stationary rectifier means 50.

Main field winding 33 of exciter stator 32 is connected by conductors 58 and 59 to the output of stationary rectifier means 50.

Primary winding 61 of current transformer 63 is connected in series with generator output conductor 26, and electrical load 75 of generator 20. The secondary winding 62, of current transformer 63, is connected, by conductors 71 and 72 to the input of rectifiers 66, 67, 68 and 69.

Main field winding 33 of exciter 30, is connected by conductors 73 and 74 to the output of rectifiers 66, 67, 68 and 69.

Saturating coil winding 34 of exciter stator 32 is connected by conductors 76 and 77 across the output terminals 81 and 82 of voltage regulator 85. Conductors 78 and 79 connect input terminals 83 and 84 of voltage regulator 85 to generator output conductors 26 and 27.

Figure 3:
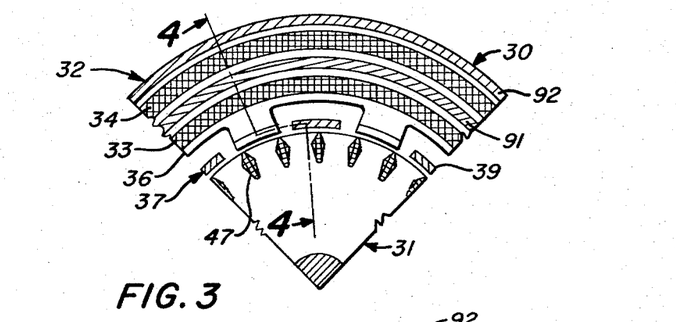
FIG. 3 is an enlarged, fragmentary view in section, taken along the line 3—3 of FIG. 1, showing the exciter portion of the exciter flux valve embodiment.

Referring now to FIG. 3, a fragmentary sectional view of an exciter 30 having a flux valve saturating coil 34, is shown as one embodiment of the invention. Stator 32 of exciter 30 is constructed with oppositely disposed magnetic spoke members 36 and 37. Each of said magnetic spoke members has a plurality of pole portions 38 and 39, respectively, which are symmetrically formed and spaced equally about the inner periphery of the respective spoke members 36 and 37. Pole portions 38 of magnetic spoke 36 are staggered, in relation to pole portions 39 of magnetic spoke 37.

When winding 33 of exciter stator 32 is energized, the pole portions of magnetic spokes 36 and 37 have opposite magnetic polarities. For example, when magnetic spokes 36 and 37 are so energized that poles 38 of spoke 36 have a north magnetic polarity, poles 39 of oppositely disposed spoke 37 comprise south magnetic poles.

Exciter armature winding 47 has n poles and each magnetic spoke 36 and 37 has n/2 poles. Any combination of an even number of poles n may be used. However, it is preferable to use twelve, fourteen or sixteen poles as n, for optimum exciter space and performance in a 4-pole, 60 cycle, 1800 r.p.m. generator.

Exciter stator 32 is further constructed with a main field magnetic yoke 91 and a saturating coil magnetic yoke 92. Yoke 91 is located intermediate magnetic spokes 36 and 37 and is radially disposed about exciter rotor 31. Saturating coil yoke 92 is disposed radially about main field yoke 91 and magnetic spokes 36 and 37.

Main field coil 33 is disposed coaxially of exciter rotor 31, and contained within oppositely disposed spokes 36 and 37, intermediate pole portions 38 and 39 and main field yoke 91. A coaxially wound saturating coil 34 is disposed about main field yoke 91 and within saturating coil yoke 92, intermediate magnetic spokes 36 and 37.

Armature winding 47 of exciter rotor 31 may have any configuration which is suitable for meeting the excitation requirements of generator 20.

Referring to FIG. 4 for a diagrammatic representation of the magnetic circuits provided in the device of this invention; magnetic spoke 36 may be considered as having pole portions 38 with a north magnetic polarity. Under these circumstances, pole portions 39 of magnetic spoke 37 have a south magnetic polarity, when main field winding 33 of the exciter stator is suitably energized by a direct current. When main field winding 33 of exciter stator 32 is thus energized, a magnetic flux is caused to flow axially across the main field yoke 91 and saturating field yoke 92. The flux then flows radially out north magnetic spoke 36, and poles 38, and into rotor 31 where a voltage is generated in rotor winding 47.

The flux re-enters the stator field at south magnetic pole 39 and proceeds radially out south magnetic pole 39 and spoke 37, re-entering main field yoke 91 and saturating coil yoke 92 to complete the main field magnetic circuit 65 provided in the device.

When energized by a direct current, saturating coil winding 34 causes a magnetic flux to flow in a saturating coil magnetic circuit 64. The saturating coil flux flows across exciter saturating coil yoke 92, then radially along magnetic spoke 37, across main field yoke 91, and radially out magnetic spoke 36, re-entering saturating coil yoke 92 to complete the saturating coil magnetic circuit. It is essential that saturating coil winding 34 be so energized that the magnetic flux produced by saturating coil 34 will flow across main field yoke 91 in the same direction as the flux produced by main field winding 33, which was previously described.

An increase in the output voltage of generator 20 results in an increase in the power supplied to the exciter stator saturating winding 34. An increase in the power supplied to winding 34 of the exciter serves to increase the saturation and therefore to increase the magnetic reluctance of the main field magnetic circuit 65 (FIG. 4), thus causing a decrease in the power output of exciter 30. A decrease in the exciter output results in a decrease in the current in generator rotor field winding 23, which in turn operates to reduce the output voltage of generator 20. Thus it is seen that exciter saturating coil winding 34 and voltage regulator 85 cooperate to control the voltage generated by exciter rotor 31 in response to the output voltage of winding 24 of generator 20.

Housing 18 (FIG. 1) is preferably constructed of a suitable non-magnetic material to provide a high reluctance barrier to leakage flux which results from operation of the coaxial windings 33 and 34 of exciter stator 32. Of course, if desired, shaft 17 may be formed of non-magnetic material and will then accomplish a like result, in which case housing 18 may be formed of a magnetic material.

Toroidal saturating coil embodiment

Referring to FIG. 5 for a fragmentary view of a second embodiment of the invention, it is seen that exciter portion 93 of machine 90 is provided with a toroidal saturating coil 94. Exciter stator 95 comprises a laminated core 96, formed with a plurality of slots 97 (FIG. 6), which are symmetrically formed and spaced equally around the inner periphery of core 96. Exciter stator 93 has a direct current main field winding 98, direct current saturating coil winding 94, which is wound in toroidal fashion about core 96 of exciter stator 93. Elements of the toroidal saturating coil embodiment are inter-connected electrically in accordance with the circuit diagram of FIG. 2.

Figure 6:
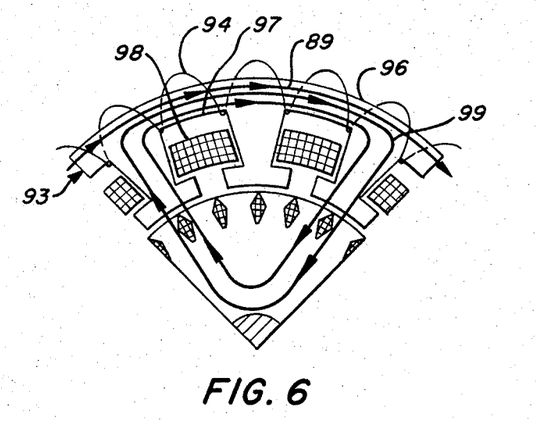
FIG. 6 is a fragmentary view in section, taken along the line 6—6 of FIG. 5, showing the exciter portion of the toridal saturating coil embodiment; the saturating winding being shown diagrammatically, for clarity of illustration.

When the current in toroidal saturating coil winding 94 is increased; the saturation and magnetic reluctance of the exciter main field magnetic circuit 99 will also increase, and thus cause a decrease in the voltage of the alternating current delivered by exciter rotor winding 100 to rotor winding 101 of generator 103.

Polyfield saturating coil embodiment

Figure 7:
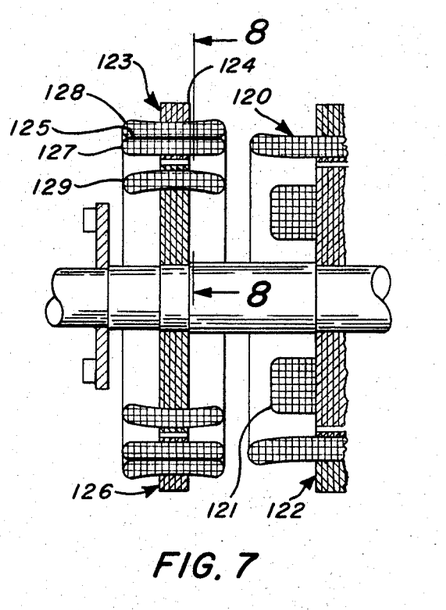
FIG. 7 is a fragmentary longitudinal section showing the structure of a polyfield saturating coil.

A third embodiment of this invention is seen in the fragmentary view of FIG. 7 as comprising a machine designated generally as 120. Exciter stator portion 123 of machine 120 comprises a laminated core 124, formed with a plurality of slots 125 (FIG. 8), which are symmetrically formed and spaced equally about the inner periphery of core 124. Main field winding 127 of exciter stator 123 is so wound as to provide a non-salient pole stationary field for exciter 126.

Figure 8:
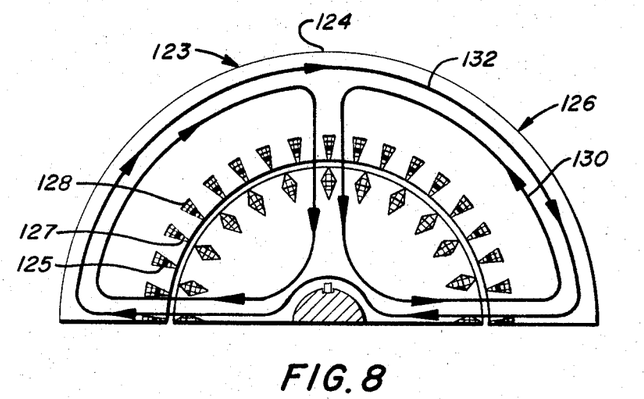
FIG. 8 is a fragmentary view in section, taken along the line 8—8 of FIG. 7, showing the exciter portion of the polyfield saturating coil embodiment.

The polyfield exciter stator saturating coil 128 is wound so as to provide a non-salient pole stationary field having a number of pole pairs different from that provided in the field of exciter main field winding 127. The field of saturating coil 128 is inductively independent of exciter stator main field winding 127 and exciter armature winding 129. Main field winding 127 and saturating field winding 128, of exciter 126 are each composed throughout of separate conductors, which are electrically insulated from each other by insulation means 131.

The elements of the polyfield saturating coil embodiment are electrically inter-connected according to the circuit diagram of FIG. 2.

It is well known that a plurality of stationary electromagnetic fields can be accommodated in the air gap of a single rotating alternating current machine. By winding the field coils in such a manner that the respective magnetic fields have different numbers of pole pairs; a plurality of magnetic fields, which are thus associated, may be made non-interacting, in the sense that no net electromotive force is generated in armature windings associated with one such magnetic field, by a magnetic field which results from a current flowing in the windings of another such field.

Figure 9:
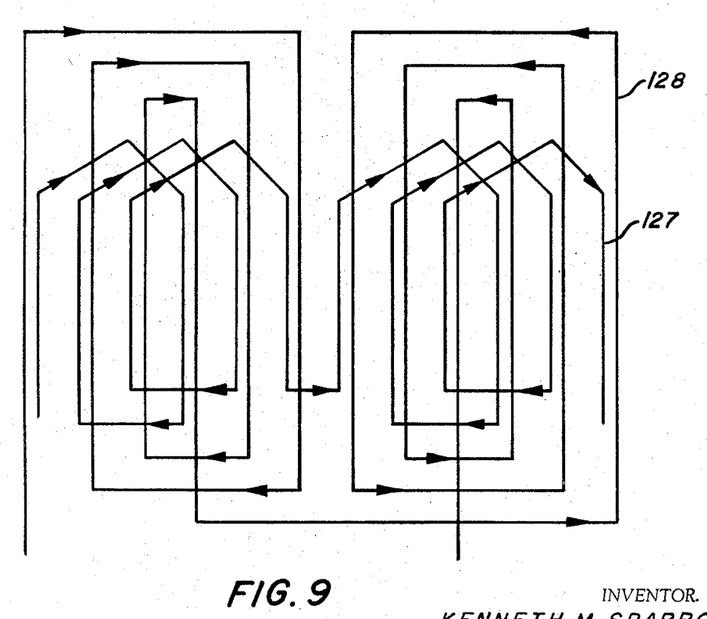
FIG. 9 is a schematic representation of the exciter stator windings in the polyfield embodiment shown in FIGS. 7 and 8.

The illustration of FIG. 9 shows in schematic diagram an example of the arrangement of windings in a machine having two non-interacting magnetic fields in the air gap.

Exciter stator main field winding 127 is wound for four poles. Exciter armature winding 129 is also wound for four poles. Exciter stator saturating coil 128 is wound for two poles, and therefore will not generate a voltage in exciter armature winding 129.

In the foregoing example, the ratio of the numbers of pole pairs in the two-field systems is an even number. However, the numbers of pole pairs may also have an odd ratio, for example, 3:1. An increase in the current in the exciter saturating coil winding 128 will operate to increase the saturation and the magnetic reluctance of the main field magnetic circuit 130 of exciter 126; and therefore cause a decrease in the output power delivered by exciter rotor winding 129 to generator rotor winding 121.

*Operation*

In the operation of the embodiments of the present invention which are illustrated in the drawings and described above, armature shaft 17 (FIG. 1) is rotated by any suitable means; such as, for example, by direct connection to a diesel engine or other prime mover known to the art. Exciter rotor 31, generator rotor 21 and rectifier means 40, each of which is connected to shaft 17, are rotated with the shaft. Thus it is seen that rotation of shaft 17 will cause alternating current voltage to be generated in generator stator winding 24 and exciter rotor winding 47; as the result of residual magnetism, inherent in exciter stator 32 and generator rotor 21. The resulting flow of alternating current in exciter rotor winding 47 and generator stator winding 24 is converted, by rectifier means 40 and 50 (FIG. 2) to a unidirectional potential for a flow of direct current in the generator rotor field winding 23 and exciter stator main field winding 33, respectively.

The direct current required for excitation of the exciter stator main field winding 33 is derived from the output of rectifiers 51, 52, 53 and 54, which are connected across the output conductors 26 and 27 of generator output winding 24. The alternating current output of exciter rotor winding 47 is rectified by rotating rectifier means 40 and is supplied in the form of a direct current for excitation of generator rotating field winding 23. The load current, delivered by generator 20 to load 75, is carried through the primary winding 61 of current transformer 63. The alternating current output of the secondary winding 62 of current transformer 63 is converted by rectifiers 66, 67, 68 and 69 to a direct current, which causes an increase in the voltage supplied to the exciter main field winding 33, when electrical load 75 of generator 16 is increased.

The various embodiments of the exciter of the present invention are so designed that the exciter will at all times deliver to the rotating field of an associated generator, more power than is required to develop a current in the generator output winding which is necessary to satisfy the electrical load borne by the generator. In order to limit the power output of exciter 30, for example, to that which generator 20 requires to satisfy load 75, saturating coil winding 34 is provided in exciter stator 30, which is energized through voltage regulator 85, from the output of generator stator winding 24. The saturation and magnetic reluctance of main field magnetic circuit 65 (FIG. 4) of exciter 30, is modified by the exciter stator saturating coil winding 34, in response to an electrical characteristic of the power output of generator 20, in such a manner that it operates to control the power output of exciter 30.

An increase in the current in saturating coil winding 34 of exciter stator 30 will operate to increase the saturation and magnetic reluctance of the main field magnetic circuit. This causes a decrease in output power and voltage delivered by exciter rotor winding 47 to generator rotor winding 23. The resulting decrease in current in generator rotor winding 23 causes a decrease in the output voltage of generator 20.

It is understood that various compensating means, in addition to current transformer 63 and rectifier means 60 described herein, may be used for varying the power input to exciter stator main field winding 33, in response to variations in electrical output characteristics of generator 20. Where compounding is not required, it is apparent that current transformer 63 and rectifier means 60 may be omitted. It is to be understood that all or a part of the power supplied to exciter stator main field winding 33 may be derived from a direct current source, which is independent of machine 16.

While a particular embodiment of this invention has been shown and described as a three-phase alternating current generator, having a three-phase exciter armature, it will be apparent to those skilled in the art that this invention is also applicable to a single phase alternating current generator and to a single phase generator exciter armature. A polyphase exciter armature winding is to be preferred, since it provides a steadier rectified direct current, and thereby materially improves the wave form of the voltage developed in the generator output winding.

Although only three embodiments of this invention have been illustrated and described herein, it is to be understood that the above embodiments are shown and described for purposes of illustration only. Various modifications and alternative structures may be achieved by those having ordinary skill in the art, without departing from the spirit and scope of the invention.

I claim:

1. A dynamo electric machine, comprising: stationary means for generating an alternating electric current in the presence of a rotating magnetic field, rotatable means for producing a magnetic field when excited by a direct current, rotatable means for generating an alternating output current, when rotated in a stationary magnetic field, stationary means for producing a magnetic field when energized by a direct current, rotatable rectifier means, connecting said rotatable generating means and said rotatable field means, for converting said alternating output current, and exciting said rotatable field means, means for simultaneously rotating said rotatable field means, said rotatable generating means and said rotatable rectifier means, a magnetic circuit including said rotatable generating means and said stationary magnetic field means connected across said stationary generating means and arranged upon said stationary field means, means, for modifying the magnetic reluctance of said magnetic circuit, so as to control a characteristic of the current generated by said rotatable generating means, in response to an electrical output characteristic of said stationary generating means, means, comprising a stationary rectifier, connecting said stationary generating means and said stationary field means, for energizing said stationary field means.

2. The machine of claim 1, wherein means is provided for varying the power input to said stationary magnetic field means, in response to variations in electrical output characteristics of said stationary generating means.

3. In combination, a brushless dynamo electric machine having a stator and a rotor, an alternating current power winding on said dynamo electric machine stator, a direct current winding on said dynamo electric machine rotor, said exciter having a stator and a rotor, said exciter stator and said exciter rotor comprising an exciter main field magnetic circuit, an alternating current output winding on said exciter rotor, a rotating rectifier for converting the alternating current output of said exciter rotor winding to a unidirectional current for said dynamo electric machine rotor winding, said rotating rectifier unit being mounted for rotation with said exciter rotor and said dynamo electric machine rotor, circuit means for connecting said rotating rectifier unit to said exciter rotor winding and said dynamo electric machine rotor winding, a direct current main field winding on said exciter stator, means for energizing said exciter stator main field winding, means, including a rectifier connected between said exciter stator winding and said power winding, for varying the power input to said exciter stator main field winding in response to a variation in an electrical characteristic of said dynamo electric machine power winding, a direct current saturating coil winding on said exciter stator, and means including said exciter stator saturating coil winding for modifying the magnetic reluctance of said exciter main field magnetic circuit so as to control the power output of said exciter in response to an electrical characteristic of said dynamo electric machine power winding.

4. In combination, a brushless dynamo electric machine and a brushless exciter, said dynamo electric machine having a stator and a rotor, an alternating current power winding on said dynamo electric machine stator, a direct current winding on said dynamo electric machine rotor, said exciter having a stator and a rotor, said exciter stator and said exciter rotor comprising an exciter main field magnetic circuit, an alternating current output winding on said exciter rotor, a rotating rectifier for converting the alternating current output of said exciter rotor winding to a unidirectional current for said dynamo electric machine rotor winding, said rotating rectifier unit being mounted for rotation with said exciter rotor, and said dynamo electric machine rotor winding, circuit means for connecting said rotating rectifier unit to said exciter rotor winding and said dynamo electric machine rotor winding, said exciter stator having a plurality of magnetic spokes, each of said exciter stator magnetic spokes having poles around the inner periphery, said exciter stator having a main field magnetic yoke and a saturating coil magnetic yoke, a direct current coaxial main field winding on said exciter stator, means for energizing said exciter stator coaxial main field winding, means for varying the power input to said exciter stator coaxial main field winding, in response to a variation in an electrical characteristic of said dynamo electric machine power winding, a direct current coaxial saturating coil on said exciter stator, and means including said exciter stator saturating coil winding for modifying the magnetic reluctance of said exciter main field magnetic circuit so as to control the power output of said exciter in response to an electrical characteristic of said dynamo electric machine power winding.

5. A dynamo electric machine comprising a generator and an exciter, said generator having a stator and a rotor, an alternating current output winding on said generator stator, a direct current winding on said generator rotor, said exciter having a stator and a rotor, said exciter stator and said exciter rotor comprising a main field magnetic circuit, an alternating current output winding on said exciter rotor, a rectifier unit for converting the alternating current output of said exciter rotor to a unidirectional current for said generator rotor winding, circuit means for connecting said rectifier unit to said exciter rotor winding and said generator rotor winding, a direct current main field winding on said exciter stator, means, comprising a source of direct current, for energizing said exciter stator main field winding, means for varying the power input to said exciter stator main field winding in response to a variation in an electrical output characteristic of said generator, a direct current saturating coil winding on said exciter stator, and means including said exciter stator saturating coil winding for modifying the magnetic reluctance of said exciter main field magnetic circuit so as to control the power output of said exciter in response to an electrical output characteristic of said generator.

6. A brushless dynamo electric machine comprising a generator and an exciter, said generator having a stator and a rotor, an alternating current output winding on said generator stator, a direct current winding on said generator rotor, said exciter having a stator and a rotor, said exciter stator and said exciter rotor comprising a main field magnetic circuit, an alternating current output winding on said exciter rotor, a rotating rectifier unit for converting the alternating current output of said exciter rotor winding to a unidirectional current for said generator rotor winding, said rotating rectifier unit being mounted for rotation with said exciter rotor and said generator rotor, circuit means for connecting said rotating rectifier unit to said exciter rotor winding and said generator rotor winding, a main field winding on said exciter stator, means comprising a unidirectional current, for energizing said exciter stator main field winding, means for varying the power input to said exciter stator main field winding in response to a variation in an electrical output characteristic of said generator, a direct current saturating coil winding on said exciter stator, and means including said exciter stator saturating coil winding for modifying the magnetic reluctance of said exciter main field magnetic circuit so as to control the power output of said exciter in response to an electrical output characteristic of said generator.

7. A brushless dynamo electric machine comprising a generator and an exciter, said generator having a stator and a rotor, an alternating current output winding on said generator stator, a direct current winding on said generator rotor, said exciter having a stator and a rotor, said exciter stator and said exciter rotor comprising a main field magnetic circuit, an alternating current output winding on said exciter rotor, a rotating rectifier unit for converting the alternating current output of said exciter rotor winding to a unidirectional current for said generator rotor winding, said rotating rectifier unit being mounted for rotation with said exciter rotor and said generator rotor, circuit means for connecting said rotating rectifier unit to said exciter rotor winding and said generator rotor winding, said exciter stator having a plurality of magnetic spokes, each of said exciter magnetic spokes having poles around the inner periphery, said exciter stator having a main field magnetic yoke and a saturating coil magnetic yoke, a direct current coaxial main field winding on said exciter stator, means for energizing said exciter stator coaxial main field winding, means for varying the power input to said exciter stator coaxial main field winding in response to a variation in an electrical output characteristic of said generator, a direct current coaxial saturating coil on said exciter stator, and means including said exciter stator coaxial saturating coil winding for modifying the magnetic reluctance of said exciter main field magnetic circuit so as to control the power output of said exciter in response to an electrical output characteristic of said generator.

8. A brushless dynamo electric machine comprising a generator and an exciter, said generator having a stator and a rotor, a three-phase output winding on said generator stator, a direct current winding on said generator rotor, said exciter having a stator and a rotor, said exciter stator and said exciter rotor comprising a main field magnetic circuit, a three-phase output winding on said exciter rotor, a rotating rectifier unit for converting the alternating current output of said exciter rotor winding to a unidirectional current for said generator rotor winding, said rotating rectifier unit being mounted for rotation with said exciter rotor and said generator rotor, circuit means for connecting said rotating rectifier unit to said exciter rotor winding and said generator rotor winding, said exciter stator having two magnetic spokes, each of said exciter magnetic spokes having poles around the inner periphery, said exciter stator having a main field magnetic yoke and a saturating coil magnetic yoke, a direct current coaxial main field winding on said exciter stator, circuit means including rectifiers for connecting said exciter stator coaxial main field winding to said generator output winding, a current transformer for varying the power input to said exciter stator coaxial main field winding in response to a variation in the output current of said generator, said current transformer having a primary winding and a secondary winding, circuit means for connecting said current transformer primary winding in series with said generator output winding, circuit means including rectifiers for connecting said current transformer secondary winding to said exciter stator coaxial main field winding, a direct current coaxial saturating coil winding on said exciter stator, and means including said exciter stator coaxial saturating coil winding for modifying the magnetic reluctance of said exciter main field magnetic circuit so as to control the power output of said exciter in response to an electrical output characteristic of said generator.

9. A brushless dynamo electric machine comprising a generator and an exciter, said generator having a stator and a rotor, an alternating current output winding on said generator stator, a direct current winding on said generator rotor, said exciter having a stator and a rotor, said exciter stator and said exciter rotor comprising a main field magnetic circuit, an alternating current output winding on said exciter rotor, a rotating rectifier unit for converting the alternating current output of said exciter rotor winding to a unidirectional current for said generator rotor winding, said rotating rectifier unit being mounted for rotation with said exciter rotor and said generator rotor, circuit means for connecting said rotating rectifier unit to said exciter rotor winding and to said generator rotor winding, a main field winding on said exciter stator, means comprising a source of unidirectional energy, for energizing said exciter stator main field winding, means for varying the power input to said exciter stator main field winding in response to a variation in an electrical output characteristic of said generator, a toroidal saturating coil winding on said exciter stator, and means including a source of direct current connected to said exciter stator toroidal saturating coil winding for modifying the magnetic reluctance of said exciter main field magnetic circuit so as to control the power output of said exciter in response to an electrical output characteristic of said generator.

10. A brushless dynamo electric machine comprising a generator and an exciter, said generator having a stator and a rotor, a three-phase output winding on said generator stator, a direct current winding on said generator rotor, said exciter having a stator and a rotor, said exciter stator and said exciter rotor comprising a main field magnetic circuit, a three-phase output winding on said exciter rotor, a rotating rectifier unit for converting the alternating current output of said exciter rotor winding to a unidirectional current for said generator rotor winding, said rotating rectifier unit being mounted for rotating with said exciter rotor and said generator rotor, circuit means for connecting said rotating rectifier unit to said exciter rotor winding and said generator rotor winding, a direct current main field winding on said exciter stator, circuit means including rectifiers for connecting said exciter stator main field winding to said generator output winding, a current transformer for varying the power input to said exciter stator main field winding in response to a variation in the output current of said generator, said current transformer having a primary winding and a secondary winding, circuit means for connecting said current transformer primary winding in series with said generator output winding, circuit means including rectifiers for connecting said current transformer secondary winding to said exciter stator main field winding, a direct current toroidal saturating coil winding on said exciter stator, and means including said exciter stator toroidal saturating coil winding for modifying the magnetic reluctance of said exciter main field magnetic circuit so as to control the power output of said exciter in response to an electrical output characteristic of said generator.

11. A brushless dynamo electric machine comprising a generator and an exciter, said generator having a stator and a rotor, an alternating current output winding on said generator stator, a direct current winding on said generator rotor, said exciter having a stator and a rotor, said exciter stator and said exciter rotor comprising a main field magnetic circuit, an alternating current output winding on said exciter rotor, a rotating rectifier unit for converting the alternating current output of said exciter rotor winding to a unidirectional current for said generator rotor winding, said rotating rectifier unit being mounted for rotating with said exciter rotor and said generator rotor, circuit means for connecting said rotating rectifier unit to said exciter rotor winding and said generator rotor winding, a direct current main field excitation winding on said exciter stator, means to energize said exciter stator main field winding, means for increasing the power input to said exciter stator main field winding in response to an increase in the electrical load of said generator, a direct current polyfield saturating coil winding on said exciter stator, and means including said exciter stator polyfield saturating coil winding for modifying the magnetic reluctance of said exciter main field magnetic circuit so as to control the power output of said exciter in response to an electrical characteristic of said generator output.

12. A brushless dynamo electric machine comprising a generator and an exciter, said generator having a stator and a rotor, a three-phase output winding on said generator stator, a direct current winding on said generator rotor, said exciter having a stator and a rotor, said exciter stator and said exciter rotor comprising a main field magnetic circuit, a three-phase output winding on said exciter rotor, a rotating rectifier unit for converting the alternating current output of said exciter rotor winding to a unidirectional current for said generator rotor winding, said rotating rectifier unit being mounted for rotation with said exciter rotor and said generator rotor, circuit means for connecting said rotating rectifier unit to said exciter rotor winding and said generator rotor winding, a direct current main field winding on said exciter, circuit means including rectifiers for connecting said exciter stator main field winding to said generator output winding, a current transformer for varying the power input to said exciter stator main field winding in response to a variation in the output current of said generator, said current transformer having a primary winding and a secondary winding, circuit means for connecting said current transformer primary winding in series with said generator output, circuit means including rectifiers for connecting said current transformer secondary winding to said exciter stator main field winding, a direct current polyfield saturating coil winding on said exciter stator, and means including said exciter stator polyfield saturating coil winding for modifying the magnetic reluctance of said exciter main field circuit in response to an exciter main field circuit in response to an electrical output characteristic of said generator.

13. A dynamo electric machine comprising a stator and a rotor, said stator and said rotor comprising a main field magnetic circuit, an alternating current output winding on said rotor, a main field winding on said stator, means, comprising a unidirectional current, for energizing said stator main field winding, a saturating coil winding on said stator, and means including a source of direct current connected to said stator saturating coil winding for modifying the magnetic reluctance of said main field magnetic circuit so as to control the power output of said dynamo electric machine.

14. A dynamo electric machine comprising a stator and a rotor, said stator and said rotor comprising a main field magnetic circuit, an alternating current output winding on said rotor, said stator having a plurality of magnetic spokes, each of said magnetic spokes having poles around the inner periphery, said stator having a main field magnetic yoke and a saturating coil magnetic yoke, a direct current coaxial main field winding on said stator, means for energizing said stator coaxial main field winding, a direct current coaxial saturating coil winding on said stator, and means including said stator coaxial saturating coil winding for modifying the magnetic reluctance of said main field magnetic circuit so as to control the power output of said dynamo electric machine.

15. A dynamo electric machine comprising a stator and a rotor, said stator and said rotor comprising a main field magnetic circuit, an alternating current output winding on said rotor, a main field winding on said stator, means comprising a source of unidirectional energy, for energizing said stator main field winding, a toroidal saturating coil winding on said stator, and means including a source of direct current energy connected to said stator toroidal saturating coil winding for modifying the magnetic reluctance of said main field magnetic circuit so as to control the power output of said dynamo electric machine.

16. A dynamo electric machine comprising a stator and a rotor, said stator and said rotor comprising a main field magnetic circuit, an alternating current output winding on said rotor, a direct current main field winding on said stator, means for energizing said stator main field winding, a direct current polyfield saturating coil winding on said stator, and means including said stator polyfield saturating coil winding for modifying the magnetic reluctance of said main field magnetic circuit so as to control the power output of said dynamo electric machine.

References Cited
UNITED STATES PATENTS

| | | | |
|---|---|---|---|
| 2,992,380 | 7/1961 | Potter | 322—57 XR |
| 3,130,360 | 4/1964 | Churilow | 322—25 |
| 3,189,814 | 6/1965 | Rosenberry et al. | 322—25 |

MILTON O. HIRSHFIELD, *Primary Examiner.*

J. J. SWARTZ, R. V. LUPO, *Assistant Examiners.*